June 4, 1935.  M. SCHNAIER  2,003,517
STICK HANDLING MECHANISM
Filed Dec. 6, 1930  2 Sheets-Sheet 1
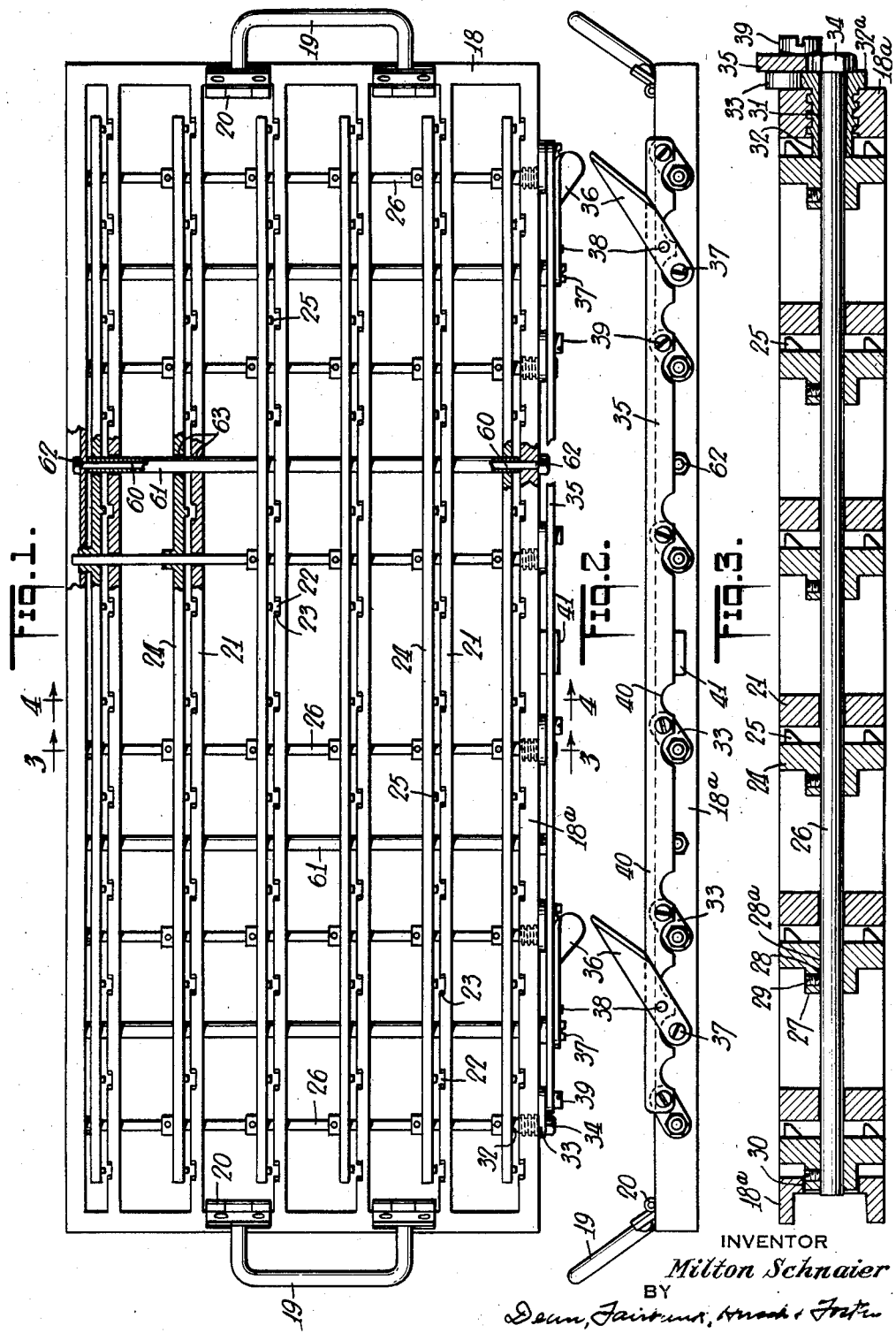
INVENTOR
*Milton Schnaier*
BY
*Dean, Fairbank, Hirsch & Foster*
ATTORNEYS June 4, 1935.    M. SCHNAIER    2,003,517
STICK HANDLING MECHANISM
Filed Dec. 6, 1930    2 Sheets-Sheet 2
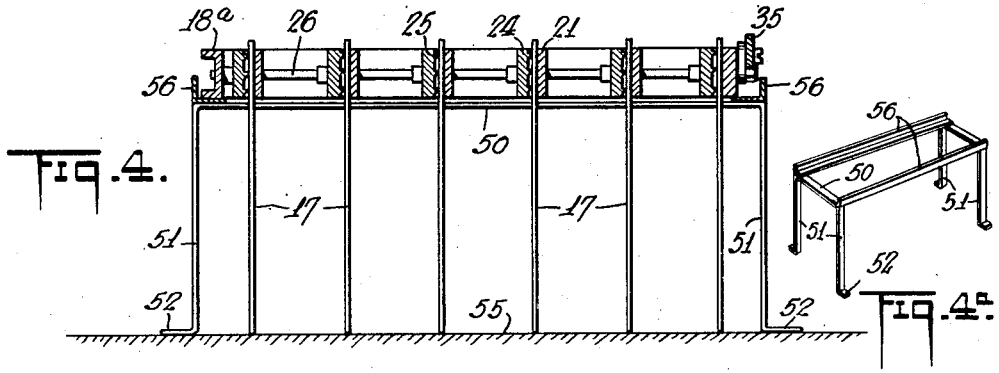
Fig.4.    Fig.4ª.
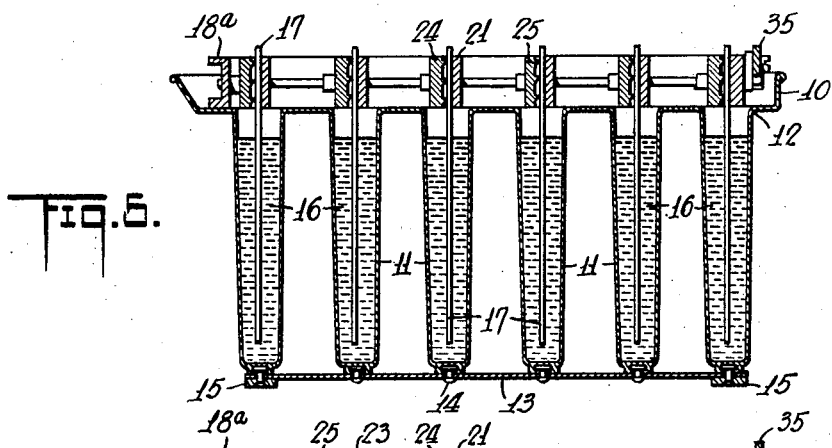
Fig.5.
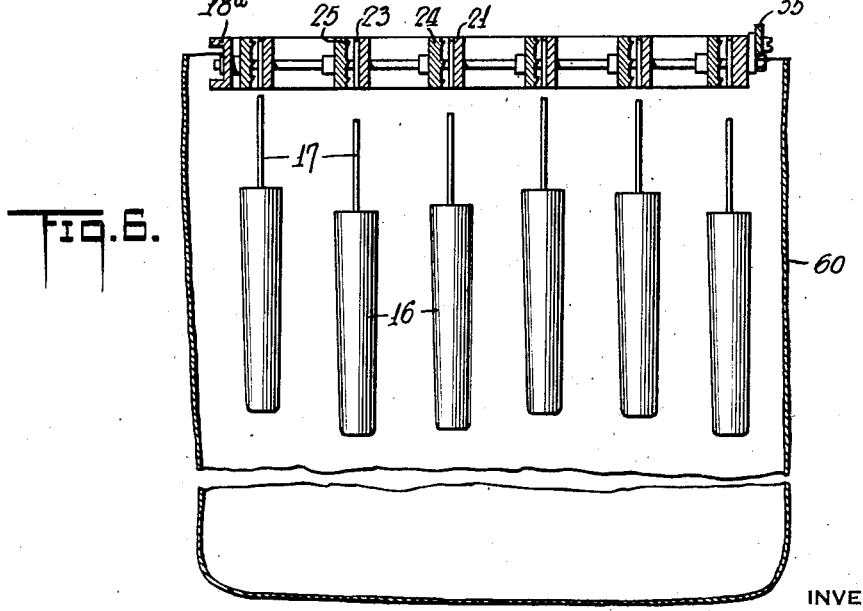
Fig.6.
INVENTOR
*Milton Schnaier*
BY
*Dean, Fairbank, Hirsch & Foster*
ATTORNEYS Patented June 4, 1935

2,003,517

UNITED STATES PATENT OFFICE 2,003,517

STICK HANDLING MECHANISM

Milton Schnaier, New York, N. Y.

Application December 6, 1930, Serial No. 500,457

13 Claims. (Cl. 107—8)

The present invention, while capable of a wider range of utility, is primarily concerned with the provision of a stick or other insert handling apparatus for facilitating and expediting the manufacture of frozen confections of the general character disclosed in Patent No. 1,505,592, granted August 19, 1924, to Frank W. Epperson.

This patent discloses a frozen confection consisting of a body of syrup intimately bonded by freezing to a handle stick which projects therefrom. In manufacturing the confection, liquid is poured into molds, handle sticks or other inserts are inserted in the molds, and suitable means are provided for preventing the same from floating upwardly during the time that the liquid or semi-liquid material is being frozen.

One object of this invention is to provide an apparatus adapted to expedite, facilitate and accomplish noteworthy simplification of the practice of the Epperson invention.

Another object is to provide efficient handling means by which simultaneous collective handling of a plurality of the inserts is attained and by which uniform positioning thereof is at all times insured.

Another object is to provide an apparatus for accurately and rapidly positioning a plurality of the inserts in the respective mold units of a multiple mold.

Another object is to provide means for rapidly and simultaneously withdrawing all of the inserts with their molded confections, and for rapidly and simultaneously depositing the removed confections, as, for instance in a bag or other suitable container in which the confections are adapted to be stored or shipped.

Another object is to accomplish the foregoing desiderata in a simple efficient apparatus which may be readily operated by unskilled labor and which lends itself to easy adjustment, manipulation, and transportation, as well as to economic manufacture.

While the invention in its broader sense is applicable to widely different usages and numerous mechanical embodiments, the preferred embodiments herein illustrated and described comprise a portable carrier in the form of a rectangular holding frame, having longitudinally extending pairs of relatively movable clamping rails. The fixed rails have stick receiving notches therein and the movable rails carry teeth to move against and jam the sticks in the notches. The structure further includes operating means for simultaneously actuating all of the movable rails and thereby effect simultaneous gripping or release of the sticks.

The gripper frame is preferably supported a suitable distance above a gauging table, and all of the sticks are dropped through their respective notches in the gripper frame and bottom on the gauging table, whereby the effective length of all of the sticks is uniform. The gripper mechanism is then operated to grasp all of the inserts and the portable carrier with its inserts is deposited in the filling pan or tray of a multiple mold, having a plurality of mold cavities. Each insert is thus accurately centered relative to its associated mold cavity, each insert extends the same depth into the cavity, and each insert is held against upward floatation in the liquid to be frozen, due to the weight of the portable carrier. As a result, when the syrupy material contained in the mold cavities is frozen to the sticks, each confection will be uniform in so far as the relation of the frozen body to the insert is concerned.

The invention may be more fully understood from the following description in connection with the accompanying drawings, wherein Fig. 1 is a top plan view of one embodiment of the invention, with parts broken away and in section.

Fig. 2 is a side elevational view thereof.

Fig. 3 is an enlarged transverse sectional view therethrough, taken approximately on the line 3—3 of Fig. 1.

Fig. 4 is a transverse sectional view taken on the line 4—4 of Fig. 1, and showing the device in combination with a gauging support.

Fig. 4a is a reduced perspective view of the gauging support alone.

Fig. 5 is a sectional view, showing the device in operating position upon the mold with the various sticks properly centered and immersed in the liquid of the molds, and Fig. 6 is a sectional view, showing the stick gripping machine in position over a bag or other container, and showing the confections dropping into the bag as the handles thereof are simultaneously released by the gripper mechanism.

The detailed construction of the stick or other insert apparatus is most clearly shown in Figs. 1, 2 and 3, the frame 18 being shown as of elongated rectangular shape. Handle bails 19 are hingedly connected as at 20 to the frame ends and permit the latter to be conveniently lifted and transported. A plurality of parallel spaced stationary rails or bars 21 extend from end to end of the frame 18 between the side pieces 18a thereof. Each rail 21 at regularly spaced intervals is provided in one side thereof with notches 22, each notch being preferably the approximate width of the sticks to be handled. The tops of the notches are bevelled outwardly as at 23 to facilitate guiding a stick into position within the notch.

Each stationary rail 21 has associated therewith a laterally movable complementary clamping rail or bar 24, carrying teeth 25 adapted to move into the notches 22 and clamp the sticks therein.

The rails 24 are firmly fixed on axially movable transversely extending rods 26. While other means might be utilized for rigidly fixing the rails to the rods, the rails 24 are preferably provided with central laterally extending integral collars 27 having central openings 28 coinciding with similar openings 28a in the rails 21, while set-screws 29 working through the collars 27 effect locking engagement between said collars and the rods 26 and consequently between the rails 24 and the rods 26.

For simultaneously axially shifting the rods 26 and thereby transversely moving the rails 24, I provide externally threaded bushings 32 on the end of each rod and working in correspondingly threaded openings in frame bar 18a. On the outer face of the frame a crank arm 33 is fixed to each bushing 32 by a receiving nut 34 which abuts the outer end of the bushing 32. The inner end of each bushing 32 abuts the face of the nearest movable clamping rail 24. To provide a sliding bearing for the opposite end of each pull rod, a circular opening 30 of proper diameter is drilled in the opposite frame bar and accommodates collar 27 of the outermost movable clamping rail 24.

Axial movement of the rods, and hence transverse movement of the rails 24, is provided for by the cam action of the threaded bushings 32 when rotated. All of the crank arms 33 have their free ends connected to a common link 35 extending longitudinally of the side pieces 18a and spaced therefrom only by the thickness of the crank arms.

To facilitate operation of this link to swing the crank arms back and forth, handle levers 36 are pivotally connected at 37 to the frame member 18a, and pivotally connected at 38 to the link 35. The pivots 37 are directly in line with the axis of rotation of the crank arms, and the pivots 38 are directly in line with the pivots 39 which connect the link with the free ends of all of the crank arms whereby there will be no binding action as the handles 36 are swung in one direction or the other to rock the crank arms.

In operation, either or both of the handles 36 may be grasped and swung from one extreme position to the other, thereby shifting the link 35, rocking the crank arms 33 and causing endwise movement of the bushings 32 with corresponding advance or retraction of the movable rails 24 toward or away from the stationary rails 21. It will be noted that link 35 has a number of recesses 40 in its lower edge, so that in either of the extreme positions of the link it will clear nuts 34. Movement in both directions is limited by the provision of one or more stop lugs 41 fixed to one of the pieces 18a. Limitation of this movement is desirable inasmuch as excessive retraction of the movable clamping rails would let the sticks 16 wabble about in their holders, and excessive advance of the movable clamping bars 24 might seriously damage or crack the light flat wooden sticks commonly employed.

If the movable clamping bars or rails 24 were unsupported, except by the rods 26, there might be some tendency for the bars 24 or the rods 26 or both of them to sag and impose unnecessary strains and stresses in normal operation of the machine. Consequently I preferably provide means for supporting the clamping bars 24 which is entirely independent of the pull rods 26, and which tends to lend rigidity to the entire construction. This means is illustratively shown as tie bolts 60 extending transversely from one frame member 18a to the other. Spacer sleeves 61 encircle the bolts and abut the respective inner faces of the frame sides 18a, 18a, and nuts 62 screwed to the ends of the tie rods and against the outer faces of such frame members tend to pull the latter together to an extent limited by the spacer sleeves 61. Both the stationary clamping bars 21 and the movable clamping bars 24 are provided with aligned openings 63 to accommodate the spacer sleeves 60, and the sagging tendency of either of the clamping bars is thus effectively overcome.

Referring now to Fig. 4 and Fig. 4a, I have shown a gauging frame for supporting the apparatus at the proper height above a table. This frame may consist simply of a pair of inverted U-shaped supports at each end, the intermediate portions 50 of which constitute rails and the ends of which serve as legs 51, the legs being turned outwardly at their extremities to provide feet 52. A pair of angle bars 56 connected at their ends to the U-shaped brackets cooperate with them to form a rectangular ledge upon which the frame member 18 may be supported.

In Fig. 5 of the drawings, I have shown a typical multiple mold unit with which the present apparatus may be used. The mold consists of a flanged flat bottomed pan 10 having a plurality of individual mold units 11 pendant therefrom. The mold units 11 are of elongated form tapering toward their lower end, and their open mouths are crimped or otherwise secured as at 12 through corresponding openings in the pan bottom. The bottom of each transverse row of mold units 11 may be connected by a cross-brace 13 riveted at 14 to the bottom of each mold, and the ends of the cross-braces are preferably connected to runners 15 to facilitate the sliding of the mold unit into or out of a freezing chamber.

In practicing the Epperson invention above referred to, the portable insert carrier is placed upon the supporting frame 50, 56, which sustains it at a suitable distance above a table 55, or other suitable gauging support. The handle levers 36 or either of them are swung to the right as in Fig. 2 opening to the fullest extent the stick receiving guides cooperatively defined by the notches 22, and the teeth 25. A plurality of the inserts 17 are then dropped into position through the guides with their lower ends resting on the gauging table 55, and their upper ends confined within the guides 22, 25.

By reversing the position of the handles 36, clamping bars 24 are caused to move toward the stationary clamping bars 21 so that the teeth 25 firmly engage the upper ends of the sticks, and the sticks are clamped between such teeth and the bottoms of the notches 22.

The portable insert carrier may now be bodily removed from the gauging frame and placed upon the flat pan 12 of the multiple mold. The portable carrier is fitted into pan 12, thereby centering the inserts with respect to the various mold cavities and causing said inserts to project a uniform distance into said cavities. Obviously the portable carrier will be heavy enough, and will grip the sticks with sufficient force to prevent any of them from floating upwardly in the liquid.

The next step of the process is to slide the multiple mold into a freezing chamber, where the confections are rapidly frozen, becoming bonded by freezing both to the inserts and to the walls of their molds. The mold unit is then withdrawn from the freezing chamber and the pendant mold units 11 dipped in hot water or otherwise subjected to heat, so that the bond between the mold walls and the bodies of the confections is broken. Thereupon the portable carrier may be bodily lifted up. Since this mechanism is locked to the insert and the latter are frozen to the edible body 16, all of the confections are simultaneously lifted out of the mold with the portable insert carrier. To release the confections from the gripper, it is merely necessary to swing one of the handle levers 36 to reverse position, thereby releasing all of the sticks and freeing the confections, which may simultaneously drop into a bag 60 or other suitable container.

In connection with the method of forming the confection and subsequent operations on the confection after freezing, reference may be had to my copending application, Serial No. 453,896, filed May 20, 1930 in which the complete operation involving subsequent packaging of the confection is fully disclosed, the present application providing a stick handling apparatus or portable insert carrier designed for use in a manner similar to the use of the corresponding apparatus of the above case. In this connection, it will be understood that the invention is not confined to any specific shape of mold and that the device is applicable to variously characterized angular walled molds and is not confined to the cylindrical molds herein disclosed by way of illustration. Neither is the invention confined to the formation of confection by freezing, but supercooled confections, such as candy or other self-hardening constituents, may be used in the manner of the material herein specified.

It will be seen that the present apparatus obviates the danger of non-uniformity of product, in so far as improperly centered sticks are concerned, completely solves the problem of holding the sticks against flotation, and makes possible simultaneous withdrawal of all of the confections and simultaneous deposition thereof in a suitable container.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent, is:

1. A stick handling apparatus including a frame, longitudinally extending transversely spaced fixed rails carried by said frame and each including a stick engaging notched portion along one longitudinal edge thereof and a plurality of longitudinally extending engaging means transversely movable towards said rails to secure sticks within the stick receiving portions of the rails.

2. A stick handling apparatus including a frame, a plurality of fixed transversely spaced rails extending lengthwise of the frame, a plurality of transversely movable rails extending lengthwise of said frame, means for positively moving them in both directions, stick engaging members carried by the movable rails, whereby transverse movement of the movable rails toward the fixed rails will move the members to engage sticks between said rails.

3. A stick handling apparatus including a frame, a plurality of fixed rails extending lengthwise of the frame, a plurality of transversely movable rails, stick engaging members carried by the movable rails, whereby transverse movement of the movable rails toward the fixed rails will move the members to engage sticks between said rails, axially movable supporting rods for said movable rails to provide movement of said rails by said rods and means for axially moving said rods upon rotation thereof.

4. A stick handling apparatus including a frame, a plurality of parallel transversely interspaced fixed rails extending lengthwise of the frame, a plurality of parallel transversely movable rails extending lengthwise of said frame, stick engaging members carried by the movable rails, whereby transverse movement of the movable rails toward the fixed rails will move the members to engage sticks between said rails, and means including an interconnecting link between said movable rails extending substantially parallel to said latter rails for simultaneously moving said movable rails.

5. A stick handling apparatus including a frame, a plurality of interspaced longitudinally extending fixed rails carried thereby, each of said rails being notched along one longitudinal edge to receive sticks and a corresponding plurality of movable rails mounted for transverse movement toward or away from said fixed rails to retain or release sticks mounted in said notches.

6. A stick handling apparatus including a frame, a plurality of interspaced longitudinally extending fixed rails carried thereby, each of said rails being notched along one longitudinal edge to receive sticks and a corresponding plurality of movable rails mounted for transverse movement toward or away from said fixed rails to retain or release sticks mounted in said notches and axially movable supporting rods for said rails.

7. A stick handling apparatus including a frame, a plurality of longitudinally extending fixed rails carried thereby, said rails being notched to receive sticks and a corresponding plurality of movable rails mounted for transverse movement toward or away from said fixed rails to retain or release sticks mounted in said notches and axially movable supporting rods for said rails, each of said rods including a bushing axially movable therewith and carried by said frame for axial movement upon rotation thereof in said frame.

8. A stick handling apparatus including a frame, a plurality of longitudinally extending fixed rails carried thereby, said rails being notched to receive sticks and a corresponding plurality of movable rails mounted for transverse movement toward or away from said fixed rails, axially movable supporting rods for said rails, each of said rods including a bushing axially movable therewith and carried by said frame for axial movement upon rotation thereof in said frame, and crank arms carried by said rods, an interconnecting link associated with all of said cranks for simultaneously rotating all of said bushings, and a handle pivotally connected with said frame and with said link for manually controlling the same.

9. A splint receiving and retaining apparatus adapted to be filled over a splint gauging table and including a frame member, a plurality of fixed longitudinally extending spaced parallel rails connecting the ends of the frame member, said rails having notches therein adapted to receive splints inserted thereto, to an extent limited by the sub-gauging table, a movable rail closely associated with each fixed rail, adapted to limit lateral movement of the splints as they are dropped into position and positive means for selectively moving said second mentioned rail laterally into position toward splint clamping or splint releasing position.

10. A splint receiving and retaining apparatus adapted to be filled over a splint gauging table and including a frame member, a plurality of fixed longitudinally extending spaced parallel rails connecting the ends of the frame member, said rails having notches therein adapted to receive splints inserted thereto, to an extent limited by the sub-gauging table, a movable rail closely associated with each fixed rail, adapted to limit lateral movement of the splints as they are dropped into position and positive means for selectively moving said second mentioned rail laterally into position toward splint clamping or splint releasing position, said movable rails including stick clamping devices disposed in close contiguity to said notches.

11. A stick handling apparatus including a plurality of transversely spaced fixed rails, each including a series of spaced notches along one longitudinal edge thereof, a plurality of stick engaging elements spaced from said rails to permit the insertion of sticks between the notches and said elements, and movable towards the notches to retain the sticks within said notches and between said rails and said elements, and a link connected for movement with all of said movable elements whereby the movement of one of said elements will cause the simultaneous movement of all of said elements.

12. A stick handling apparatus including a light, rigid, skeleton frame, a plurality of fixed interspaced rails, said rails having portions adapted to loosely receive a plurality of sticks in spaced relationship, a plurality of rails mounted for movement towards or away from said fixed rails, and adapted to rigidly hold the sticks in spaced relationship therebetween, a rotatable member, and means responsive to the rotation of said member for moving all of said rails simultaneously towards or away from said fixed rails to retain or release the sticks.

13. A stick handling apparatus including a plurality of fixed spaced longitudinal members, each having a plurality of interspaced notches along one edge thereof, said notches being adapted to loosely receive a corresponding plurality of sticks in spaced relationship, and a plurality of longitudinal members substantially parallel to said fixed members and occupying but a part of the spaces between said fixed members and contiguous to and facing said notches, said latter members being movable towards and away from said fixed members and having a plurality of elements projecting therefrom and adapted to engage portions of said sticks in said notches when said second mentioned members are moved towards said fixed members to thereby rigidly retain the sticks in spaced relationship.

MILTON SCHNAIER.